US008572378B2

(12) United States Patent
Lai et al.

(10) Patent No.: US 8,572,378 B2
(45) Date of Patent: Oct. 29, 2013

(54) METHOD FOR PROTECTING THE FIRST MESSAGE OF SECURITY PROTOCOL

(75) Inventors: Xiaolong Lai, Shaanxi (CN); Jun Cao, Shaanxi (CN); Yuelei Xiao, Shaanxi (CN); Manxia Tie, Shaanxi (CN); Zhenhai Huang, Shaanxi (CN); Bianling Zhang, Shaanxi (CN); Yanan Hu, Shaanxi (CN)

(73) Assignee: China Iwncomm Co., Ltd., Shaanxi (CN)

( * ) Notice: Subject to any disclaimer, the term of this patent is extended or adjusted under 35 U.S.C. 154(b) by 310 days.

(21) Appl. No.: 13/140,632

(22) PCT Filed: Dec. 7, 2009

(86) PCT No.: PCT/CN2009/075366
§ 371 (c)(1),
(2), (4) Date: Jun. 17, 2011

(87) PCT Pub. No.: WO2010/069233
PCT Pub. Date: Jun. 24, 2010

(65) Prior Publication Data
US 2011/0252239 A1 Oct. 13, 2011

(30) Foreign Application Priority Data
Dec. 18, 2008 (CN) .......................... 2008 1 0190610

(51) Int. Cl.
*H04L 29/06* (2006.01)
(52) U.S. Cl.
USPC ........... 713/168; 713/169; 713/170; 713/171; 380/229
(58) Field of Classification Search
USPC ................... 713/168, 169, 170, 171; 380/229
See application file for complete search history.

(56) References Cited

U.S. PATENT DOCUMENTS

| 2008/0065884 A1* | 3/2008 | Emeott et al. ................. 713/168 |
| 2008/0159535 A1 | 7/2008 | Kim et al. |

FOREIGN PATENT DOCUMENTS

| CN | 1964258 | 5/2007 |
| CN | 101394412 | 3/2009 |
| CN | 101442531 | 5/2009 |

OTHER PUBLICATIONS

International Search Report issued in PCT/CN2009/075366, mailed Mar. 18, 2010.
Chinese Office Action issued in Chinese counterpart application 200810190610.7, dated Apr. 14, 2010.
Changhua He et al.; "Analysis of the 802.11i 4-Way Handshake"; Electrical Engineering and Computer Science Depts., Stanford University, Stanford, CA; 2004; pp. 1-8.
Songhe Zhao et al.; "Addressing the Vulnerability of the 4-Way Handshake of 802.11i"; IEEE; 2008; pp. 351-356.
Jing Liu et al.; "Security Verification of 802.11i 4-Way Handshake Protocol"; IEEE; 2008; pp. 1642-1647.

* cited by examiner

*Primary Examiner* — Jeffrey Pwu
*Assistant Examiner* — Thong Truong
(74) *Attorney, Agent, or Firm* — Greer, Burns & Crain, Ltd.

(57) ABSTRACT

The present invention provides a method for protecting the first message of a security protocol and the method includes the following steps: 1) initialization step; 2) the initiating side sends the first message; 3) the responding side receives the first message. The method for protecting the first message of the security protocol provided by the present invention can implement that: 1) Pre-Shared Master Key (PSMK), which is shared by the initiating side and responding side, and the security parameter in the first message are bound by using computation function of Message Integrality Code (MIC) or Message Authentication Code (MAC), and thus the fabrication attack of the first message in the security protocol is avoided effectively; 2) during computing the MIC or MAC of the first message, only PSMK and the security parameter of the first message are selected to be computed, and thus the computation load of the initiating side and the responding side is effectively reduced and the computation resource is saved.

16 Claims, No Drawings

METHOD FOR PROTECTING THE FIRST MESSAGE OF SECURITY PROTOCOL

The present application is a US National Stage of International Application No. PCT/CN2009/075366, filed 7 Dec. 2009, designating the United States, and claiming priority to Chinese Patent Application No. 200810190610.7, filed with the State Intellectual Property Office of the People's Republic of China on Dec. 18, 2008 and entitled "Method for protecting the first message of security protocol", both of which are hereby incorporated by reference in their entirety.

FIELD OF THE INVENTION

The present invention relates to a method for protecting a first message of a security protocol.

BACKGROUND OF THE INVENTION

A security protocol has become ubiquitous along with rapid development of a communication network. However, researchers tend to design the security protocol while discarding the security of a first message so that an attacker may forge or retransmit arbitrarily the first message for the purpose of attacking the security protocol. In fact, the security of the first message is disregarded with an insignificant influence and at most a waste of resources in the majority of communication networks except some special ones, e.g., an Ultra Wideband (UWB) communication network. Ultra Wideband refers to carrier-free communication where data is transmitted in a sine wave narrow pulse on the order of nanoseconds to microseconds. The majority of devices in the Ultra Wideband communication network are low-power and low-consumption devices (powered with a battery) with rather precious resources of power, communication, storage, etc., so the security of the first message has to be considered to design their applicable security protocol.

At present, in a general method for addressing the security of a first message of a security protocol, a Message Integrity Code (MIC) or a Message Authentication Code (MAC), both of which function to prevent the first message of the security protocol from being forged, is calculated on the first message of the security protocol from pre-shared private information. However, the inventors have identified, during making of the invention, at least the following technical drawback present in the prior art: the MIC or the MAC is calculated on all of parameters in the first message of the security protocol from the pre-shared private information in the foregoing method, which may be computationally extensive and consequently waste computational resources.

SUMMARY OF THE INVENTION

In order to address the foregoing technical problem present in the prior art, the invention provides a method for protecting a first message of a security protocol.

In a technical solution of the invention, the invention provides a method for protecting a first message of a security protocol, which includes the following operations:

1) Initializing an initiator and a responder pre-share private information of a Pre-Shared Master Key (PSMK) and possess the same Master Key Identifier (MKID) identifying the Pre-Shared Master Key (PSMK), and support the same function of calculating a Message Integrity Code (MIC) or a Message Authentication Code (MAC);

2) Transmitting a First Message by the Initiator the initiator calculates a Message Integrity Code (MIC) or a Message Authentication Code (MAC) on security parameters to be transmitted in the first message and the Pre-Shared Master Key (PSMK) with the function of calculating a Message Integrity Code (MIC) or a Message Authentication Code (MAC), and transmits to the responder the first message including a non-security parameter, the security parameters, the Master Key Identifier (MKID), and the Message Integrity Code (MIC) or the Message Authentication Code (MAC);

3) Receiving the First Message by the Responder the responder verifies the non-security parameter in the first message for legality upon reception of the first message, and if the non-security parameter is illegal, the responder discards the first message and sets a status code to notify the initiator or disconnects a link, or if the non-security parameter is legal, the responder calculates a Message Integrity Code (MIC) or a Message Authentication Code (MAC) on the security parameters in the first message and the locally stored Pre-Shared Master Key (PSMK), and compares the calculated Message Integrity Code (MIC) or Message Authentication Code (MAC) with the received Message Integrity Code (MIC) or Message Authentication Code (MAC), and if the calculated MIC or MAC is different from the received MIC or MAC, the responder discards the first message and sets a status code to notify the initiator or disconnects the link, or if the calculated MIC or MAC is the same as the received MIC or MAC, the responder further verifies the security parameters in the first message for legality, and if there is an illegal value in the security parameters, the responder discards the first message and sets a status code to notify the initiator or disconnects the link.

In the operation 1), the function of calculating a Message Integrity Code (MIC) or a Message Authentication Code (MAC) is a unidirectional extension function $f(x,y\|str)$, where x represents a value of a key for extension, y represents security parameters for extension, str represents a padding character string for extension, and $\|$ represents a cascade of character strings.

In the operation 2), the first message is MN$\|$SC$\|$PTKID$\|$MKID$\|$I-Nonce$\|$$f$(PSMK, PTKID$\|$I-Nonce$\|$I-MAC$\|$R-MAC$\|$str), where the I-MAC and the R-MAC represent MAC addresses of the initiator and the responder respectively, the Message Number (MN)=1, the Status Code (SC)=0, the Pairwise Temporal Key Identifier (PTKID) represents a value selected randomly by the initiator and different from a Temporal Key Identifier (TKID) locally stored or used in an ongoing Pairwise Temporal Key (PTK) negotiation protocol or Group Temporal Key (GTK) distribution protocol, the I-Nonce represents a random number generated by the initiator, the $f$(PSMK, PTKID$\|$I-Nonce$\|$I-MAC$\|$R-MAC$\|$str) represents the Message Integrity Code (MIC) or the Message Authentication Code (MAC) calculated by the initiator, and the str represents the padding character string for extension.

In the operation 3), the responder verifies whether a locally stored Master Key Identifier is the same as the Master Key Identifier included in the first message upon reception of the first message, and if they are different, the responder discards the first message, or if they are the same, the responder verifies whether the Pairwise Temporal Key (PTK) negotiation protocol is being performed locally with the Master Key Identifier (MKID), and if so, the responder discards the first message and sets a Status Code (SC)=2 to notify the initiator or disconnects the link, or if not, the responder calculates $f$(PSMK, PTKID$\|$I-Nonce$\|$I-MAC$\|$R-MAC$\|$str) from the locally stored I-MAC and R-MAC and compares the calculated $f$(PSMK, PTKID∥I-Nonce∥I-MAC∥R-MAC∥str) with the received $f$(PSMK, PTKID∥I-Nonce∥I-MAC∥R-MAC∥str), and if they are different, the responder discards the first message and sets a Status Code (SC)=1 to notify the initiator or disconnects the link, or if they are the same, the responder verifies whether the Pairwise Temporal Key Identifier (PTKID) is the same as the Temporal Key Identifier (TKID) locally stored or used in the ongoing Pairwise Temporal Key (PTK) negotiation handshake protocol or Group Temporal Key (GTK) distribution protocol, and if they are the same, the responder discards the first message and sets a Status Code (SC)=3 to notify the initiator or disconnects the link, or if they are different, the responder sets the Status Code (SC)=0 and constructs and transmits to the initiator a second message to proceed with the Pairwise Temporal Key (PTK) negotiation handshake protocol.

The security parameters refer to parameters related to the security of the first message and include all variable parameters and a part of non-variable parameters. For example, the part of non-variable parameters may be a cascade value of MAC addresses of the initiator and the responder.

The variable parameter refers to a parameter determined from a reference value other than a unique reference value by the responder upon verification, e.g., the Pairwise Temporal Key Identifier (PTKID) generated randomly by the initiator and the random number I-Nonce generated by the initiator in the first message.

The non-variable parameter refers to a parameter determined from a unique reference value by the responder upon verification, e.g., MN=1, SC=0 and MKID, which is the Master Key Identifier of the Pre-Shared Master Key (PSMK) pre-shared between the initiator and the responder, in the first message.

When the Pre-Shared Master Key (PSMK) is pre-shared by more than two devices, the cascade value of MAC addresses of the initiator and the responder is a variable parameter; and when the Pre-Shared Master Key (PSMK) is pre-shared by two devices, the cascade value of MAC addresses of the initiator and the responder is a non-variable parameter.

In the method for protecting a first message of a security protocol according to the invention, the initiator and the responder of the security protocol pre-share the private information and possess the same function of calculating a Message Integrity Code (MIC) or a Message Authentication Code (MAC), the initiator calculates on the security parameters in the first message and the pre-shared private information with the function of calculating a Message Integrity Code (MIC) or a Message Authentication Code (MAC) before transmitting the first message and transmits to the responder the first message including the non-security parameter, the security parameters and the calculated Message Integrity Code (MIC) or Message Authentication Code (MAC). Upon reception of the first message, the responder verifies the non-security parameter in the first message, and if the verification is not passed, the responder discards the first message and sets a status code to notify the initiator or disconnects the link, or if the verification is passed, the responder recalculates locally a Message Integrity Code (MIC) or a Message Authentication Code (MAC), and compares the locally calculated Message Integrity Code (MIC) or Message Authentication Code (MAC) with the received Message Integrity Code (MIC) or Message Authentication Code (MAC), and if they are different, the responder discards the first message and sets a status code to notify the initiator or disconnects the link, or if they are the same, the responder verifies the security parameters in the first message, and if the verification is not passed, the responder discards the first message and sets a status code to notify the initiator or disconnects the link, or if the verification is passed, the responder proceeds with the security protocol.

The invention has the following advantages:

1) the Pre-Shared Master Key (PSMK) pre-shared by the initiator and the responder and the security parameters in the first message are bound using the function of calculating a Message Integrity Code (MIC) or a Message Authentication Code (MAC) to thereby prevent effectively the first message in the security protocol from being subject to a forgery attack; and 2) the Message Integrity Code (MIC) or the Message Authentication Code (MAC) of the first message is calculated only on the Pre-Shared Master Key (PSMK) and the security parameters in the first message to thereby reduce effectively an effort of calculation by the initiator and the responder and consequently conserve computable resources.

DETAILED DESCRIPTION OF THE EMBODIMENTS

A specific method according to the invention is performed as follows.

1) Initialization

An initiator and a responder pre-share private information, i.e., a Pre-Shared Master Key (PSMK), and possess the same Master Key Identifier (MKID), that is, both the initiator and the responder possess the MKID corresponding to and indexing the Pre-Shared Master Key (PSMK); and the initiator and the responder support the same function of calculating a Message Integrity Code (MIC) or a Message Authentication Code (MAC). For example, the function of calculating a Message Integrity Code (MIC) or a Message Authentication Code (MAC) may be a unidirectional extension function $f(x, y∥str)$, where x represents a value of a key for extension, y represents security parameters for extension, str represents a padding character string for extension, and ∥ represents a cascade of character strings.

2) The Initiator Transmits a First Message

The initiator calculates on security parameters to be transmitted in the first message and the Pre-Shared Master Key (PSMK) with the function of calculating a Message Integrity Code (MIC) or a Message Authentication Code (MAC) and transmits to the responder the first message including a non-security parameter, the security parameters, the Master Key Identifier (MKID) and the calculated Message Integrity Code (MIC) or Message Authentication Code (MAC). For example, if the four-step handshake protocol with a Pairwise Temporal Key (PTK) in the standard of European Computer Manufacturers Association (ECMA) 368 is modified with such a method, the first message may be MN∥SC∥PTKID∥MKID∥I-Nonce∥$f$(PSMK, PTKID∥I-Nonce∥I-MAC∥R-MAC∥str), where the I-MAC and the R-MAC represent MAC addresses of the initiator and the responder respectively, the Message Number (MN)=1, the Status Code (SC)=0, the Pairwise Temporal Key Identifier (PTKID) represents a value selected randomly by the initiator (different from a Temporal Key Identifier (TKID) locally stored or used in the ongoing four-step handshake protocol with a Pairwise Temporal Key (PTK) or Group Temporal Key (GTK) distribution protocol), the I-Nonce represents a random number generated by the initiator, the $f$(PSMK, PTKID∥I-Nonce∥I-MAC∥R-MAC∥str) represents the Message Integrity Code (MIC) or the Message Authentication Code (MAC) calculated by the initiator, and the str represents the padding character string.

3) The Responder Receives the First Message

Upon reception of the first message, the responder verifies the non-security parameter in the first message for legality, and if the non-security parameter is illegal, the responder discards the first message and sets a status code to notify the initiator or disconnects a link, or if the non-security parameter is legal, the responder calculates a Message Integrity Code (MIC) or a Message Authentication Code (MAC) on the security parameters in the first message and the locally stored Pre-Shared Master Key (PSMK) and compares the calculated Message Integrity Code (MIC) or Message Authentication Code (MAC) with the received Message Integrity Code (MIC) or Message Authentication Code (MAC), and if they are different, the responder discards the first message and sets a status code to notify the initiator or disconnects the link, or if they are the same, the responder further verifies the security parameters in the first message for legality, and if there is an illegal value in the security parameters, the responder discards the first message and sets a status code to notify the initiator or disconnects the link. For example, if the four-step handshake protocol with a Pairwise Temporal Key (PTK) in the standard of ECMA 368 is modified with such a method, the responder verifies whether the Master Key Identifier (MKID) is an identifier of the Pre-Shared Master Key (PSMK) upon reception of the first message, and if not, the responder discards the first message or if so, the responder verifies whether the four-step handshake protocol with a Pairwise Temporal Key (PTK) is being performed with the Master Key Identifier (MKID), and if so, the responder discards the first message and sets a Status Code (SC)=2 to notify the initiator, or if not, the responder calculates locally $f$(PSMK, PTKID||I-Nonce||I-MAC||R-MAC||str) on the I-MAC and the R-MAC and compares the calculated $f$(PSMK, PTKID||I-Nonce||I-MAC||R-MAC||str) with the received $f$(PSMK, PTKID||I-Nonce||I-MAC||R-MAC||str), and if they are different, the responder discards the first message and sets a Status Code (SC)=1 to notify the initiator, or if they are the same, the responder verifies whether the Pairwise Temporal Key Identifier (PTKID) is the same as the Temporal Key Identifier (TKID) locally stored or used in the ongoing Pairwise Temporal Key (PTK) negotiation protocol or Group Temporal Key (GTK) distribution protocol, and if they are the same, the responder discards the first message and sets a Status Code (SC)=3 to notify the initiator, or if they are different, the responder sets a Status Code (SC)=0 and constructs and transmits to the initiator a second message to proceed with the four-step handshake protocol with a Pairwise Temporal Key (PTK).

In the method according to the embodiment of the invention, the Pre-Shared Master Key (PSMK) pre-shared by the initiator and the responder and the security parameters in the first message are bound using the function of calculating a Message Integrity Code (MIC) or a Message Authentication Code (MAC) to thereby prevent effectively the first message in the security protocol from being subject to a forgery attack; and the Message Integrity Code (MIC) or the Message Authentication Code (MAC) of the first message is calculated only from the Pre-Shared Master Key (PSMK) and the security parameters in the first message to thereby reduce effectively an effort of calculation by the initiator and the responder and consequently conserve computable resources.

It shall be noted that the foregoing embodiments are merely intended to illustrate but not limit the technical solution of the invention; and although the invention has been detailed with reference to the foregoing embodiments, those ordinarily skilled in the art shall appreciate that they can modify the technical solution recited in the foregoing embodiments or equivalently substitute a part of technical features therein without departing from the spirit and scope of the technical solution in the embodiments of the invention.

The invention claimed is:

1. A method for protecting a fist message of a security protocol, comprising the steps of:
   1) initializing
   pre-sharing, by an initiating device and a responding device, private information of a Pre-Shared Master Key, wherein the initiating device and the responding device possess the same Master Key Identifier identifying the Pre-Shared Master Key and support the same function of calculating a Message Integrity Code or a Message Authentication Code;
   2) transmitting a first message by the initiating device
   calculating, by the initiating device, a Message Integrity Code or a Message Authentication Code on security parameters to be transmitted in the first message and the Pre-Shared Master Key with the function of calculating a Message Integrity Code or a Message Authentication Code, and transmitting to the responding device the first message comprising a non-security parameter, the security parameters, the Master Key Identifier and the Message Integrity Code or the Message Authentication Code;
   3) receiving the first message by the responding device
   verifying, by the responding device, the non-security parameter in the first message for legality upon reception of the first message; and
   if the non-security parameter is illegal, discarding the first message and setting a status code to notify the initiating device or disconnecting a link; or if the non-security parameter is legal, calculating a Message Integrity Code or a Message Authentication Code on the security parameters in the first message and the locally stored Pre-Shared Master Key and comparing the calculated Message Integrity Code or Message Authentication Code with the received Message Integrity Code or Message Authentication Code; and
   if the calculated Message Integrity Code or Message Authentication Code is different from the received Message Integrity Code or Message Authentication Code, discarding the first message and setting a status code to notify the initiating device or disconnecting the link; otherwise, further verifying the security parameters in the first message for legality; and
   if there is an illegal value in the security parameters, discarding the first message and setting a status code to notify the initiating device or disconnecting the link.

2. The method for protecting a fist message of a security protocol according to claim 1, wherein in the step 1), the function of calculating a Message Integrity Code or a Message Authentication Code is a unidirectional extension function f(x,y||str), wherein x represents a value of a key for extension, y represents the security parameters for extension, str represents a padding character string for extension, and || represents a cascade of character strings.

3. The method for protecting a fist message of a security protocol according to claim 2, wherein in the step 2), the first message is MN||SC||PTKID||MKID||I-Nonce||f(PSMK, PTKID||I-Nonce||-MAC||R-MAC||str), wherein the I-MAC and the R-MAC represent MAC addresses of the initiating device and the responding device respectively, the Message Number, MN, =1, the Status Code, SC, =0, the Pairwise Temporal Key Identifier, PTKID, represents a value selected randomly by the initiating device and different from a Temporal Key Identifier locally stored or used in an ongoing Pairwise Temporal Key negotiation protocol or Group Temporal Key distribution protocol, the I-Nonce represents a random number generated by the initiating device, the f(PSMK, PTKID||I-Nonce||-MAC||R-MAC||str) represents the Message Integrity Code or the Message Authentication Code, and the str represents the padding character string for extension.

4. The method for protecting a fist message of a security protocol according to claim 3, wherein in the step 3), the responding device verifies whether the locally stored Master Key Identifier is the Master Key Identifier comprised in the first message upon reception of the first message; and if so, the responding device discards the first message; otherwise, the responding device verifies whether a negotiation handshake protocol with a Pairwise Temporal Key, PTK, is being performed locally with the Master Key Identifier; and if so, the responding device discards the first message and sets a Status Code, SC, =2 to notify the initiating device or disconnects the link; otherwise, the responding device calculates f(PSMK, PTKID|I-Nonce||I-MAC||R-MAC||str) from the locally stored I-MAC and R-MAC and compares the calculated f(PSMK, PTKID||I-Nonce||I-MAC||R-MAC||str) with the received f(PSMK, PTKI D||I-Nonce||I-MAC||R-MAC||str); and if the calculated f(PSMK, PTKID||I-Nonce||I-MAC||R-MAC||str) is different from the received f(PSMK, PTKID||I-Nonce||I-MAC||R-MAC||str), the responding device discards the first message and sets a Status Code, SC, =1 to notify the initiating device or disconnects the link; otherwise, the responding device verifies whether the Pairwise Temporal Key Identifier, PTKID, is the same as the Temporal Key Identifier, TKID, locally stored or used in the ongoing Pairwise Temporal Key, PTK, negotiation handshake protocol or Group Temporal Key, GTK, distribution protocol; and if so, the responding device discards the first message and sets a Status Code, SC, =3 to notify the initiating device or disconnects the link; otherwise, the responding device sets the Status Code, SC, =0 and constructs and transmits to the initiating device a second message to proceed with the Pairwise Temporal Key, PTK, negotiation handshake protocol.

5. The method for protecting a fist message of a security protocol according to claim 4, wherein the security parameters are parameters related to the security of the first message and comprise all variable parameters and a part of non-variable parameters.

6. The method for protecting a fist message of a security protocol according to claim 5, wherein the variable parameter is a parameter determined from a reference value other than a unique reference value by the responding device upon verification.

7. The method for protecting a fist message of a security protocol according to claim 5, wherein the non-variable parameter is a parameter determined from a unique reference value by the responding device upon verification.

8. The method for protecting a fist message of a security protocol according to claim 3, wherein the security parameters are parameters related to the security of the first message and comprise all variable parameters and a part of non-variable parameters.

9. The method for protecting a fist message of a security protocol according to claim 8, wherein the variable parameter is a parameter determined from a reference value other than a unique reference value by the responding device upon verification.

10. The method for protecting a fist message of a security protocol according to claim 8, wherein the non-variable parameter is a parameter determined from a unique reference value by the responding device upon verification.

11. The method for protecting a fist message of a security protocol according to claim 2, wherein the security parameters are parameters related to the security of the first message and comprise all variable parameters and a part of non-variable parameters.

12. The method for protecting a fist message of a security protocol according to claim 11, wherein the variable parameter is a parameter determined from a reference value other than a unique reference value by the responding device upon verification.

13. The method for protecting a fist message of a security protocol according to claim 11, wherein the non-variable parameter is a parameter determined from a unique reference value by the responding device upon verification.

14. The method for protecting a fist message of a security protocol according to claim 1, wherein the security parameters are parameters related to the security of the first message and comprise all variable parameters and a part of non-variable parameters.

15. The method for protecting a fist message of a security protocol according to claim 14, wherein the variable parameter is a parameter determined from a reference value other than a unique reference value by the responding device upon verification.

16. The method for protecting a fist message of a security protocol according to claim 14, wherein the non-variable parameter is a parameter determined from a unique reference value by the responding device upon verification.

* * * * *

UNITED STATES PATENT AND TRADEMARK OFFICE
CERTIFICATE OF CORRECTION

| | | |
|---|---|---|
| PATENT NO. | : 8,572,378 B2 | Page 1 of 1 |
| APPLICATION NO. | : 13/140632 | |
| DATED | : October 29, 2013 | |
| INVENTOR(S) | : Xiaolong Lai et al. | |

It is certified that error appears in the above-identified patent and that said Letters Patent is hereby corrected as shown below:

<u>In the Claims</u>:

Col. 6, line 5, Claim 1, delete "fist" and insert -- first --;

line 50, Claim 2, delete "fist" and insert -- first --;

line 58, Claim 3, delete "fist" and insert -- first --;

line 61, Claim 3, delete "||-MAC||" and insert -- ||I-MAC|| --.

Col. 7, line 4, Claim 3, delete "||-MAC||" and insert -- ||I-MAC|| --;

line 7, Claim 4, delete "fist" and insert -- first --;

line 20, Claim 4, delete "PTKID|I-Nonce" and insert -- PTKID||I-Nonce --;

line 43, Claim 5, delete "fist" and insert -- first --;

line 48, Claim 6, delete "fist" and insert -- first --.

Col. 8, line 4, Claim 7, delete "fist" and insert -- first --;

line 8, Claim 8, delete "fist" and insert -- first --;

line 13, Claim 9, delete "fist" and insert -- first --;

line 18, Claim 10, delete "fist" and insert -- first --;

line 22, Claim 11, delete "fist" and insert -- first --;

line 27, Claim 12, delete "fist" and insert -- first --;

line 32, Claim 13, delete "fist" and insert -- first --;

line 36, Claim 14, delete "fist" and insert -- first --;

line 41, Claim 15, delete "fist" and insert -- first --;

line 46, Claim 16, delete "fist" and insert -- first --.

Signed and Sealed this
Eighteenth Day of November, 2014

Michelle K. Lee
*Deputy Director of the United States Patent and Trademark Office*